United States Patent
Garcia et al.

(10) Patent No.: US 11,687,051 B2
(45) Date of Patent: Jun. 27, 2023

(54) CONFIGURATION OF FIELD DEVICES WITH A MOBILE DEVICE

(71) Applicant: VEGA GRIESHABER KG, Wolfach (DE)

(72) Inventors: Juan Garcia, Biberach (DE); Ralf Hoell, Titisee-Neustadt (DE)

(73) Assignee: VEGA GRIESHABER KG, Wolfach (DE)

( * ) Notice: Subject to any disclaimer, the term of this patent is extended or adjusted under 35 U.S.C. 154(b) by 271 days.

(21) Appl. No.: 17/111,381

(22) Filed: Dec. 3, 2020

(65) Prior Publication Data

US 2021/0165383 A1 Jun. 3, 2021

(30) Foreign Application Priority Data

Dec. 3, 2019 (DE) .......................... 102019218811.7

(51) Int. Cl.
G05B 19/042 (2006.01)

(52) U.S. Cl.
CPC ..... G05B 19/0428 (2013.01); G05B 19/0423 (2013.01); G05B 2219/21012 (2013.01);
(Continued)

(58) Field of Classification Search
CPC ............ G05B 19/0423; G05B 19/0426; G05B 19/0428; G05B 2219/21012;
(Continued)

(56) References Cited

U.S. PATENT DOCUMENTS 7,010,294 B1 * 3/2006 Pyotsia ................ G05B 19/042
455/3.03
10,379,527 B2 8/2019 Jundt et al.
(Continued)

FOREIGN PATENT DOCUMENTS

DE 10 2017 116 139 A1 1/2018
DE 11 2016 004 664 T5 7/2018
(Continued)

OTHER PUBLICATIONS

Analog device, Mobile configuration of field devices in process industry, May 27, 2019, pp. 1-9 (Year: 2019).*

Primary Examiner — Kidest Bahta
(74) Attorney, Agent, or Firm — Oblon, McClelland, Maier & Neustadt, L.L.P.

(57) ABSTRACT

A method for configuring a target field device in an industrial plant by way of at least one mobile device including receiving configuration data characterizing the behavior of a source field device in the industrial plant from the source field device through the mobile device by way of a radio interface of the mobile device, which is also supported by the source field device, receiving at least one identification feature characterizing a target field device and/or function of the target field device in the industrial plant by a mobile device by way of a radio interface of the mobile device, which is also supported by the target field device checking by way of the mobile device, using the identification feature, whether the configuration data are suitable and/or intended for the configuration of the target field device, and in response to the configuration data being suitable and/or provided for the configuration of the target field device, transmitting at least a subset of the configuration data from the mobile device to the target field device by way of a radio interface of the mobile device which is also supported by the target field device.

20 Claims, 2 Drawing Sheets

Figure 1:
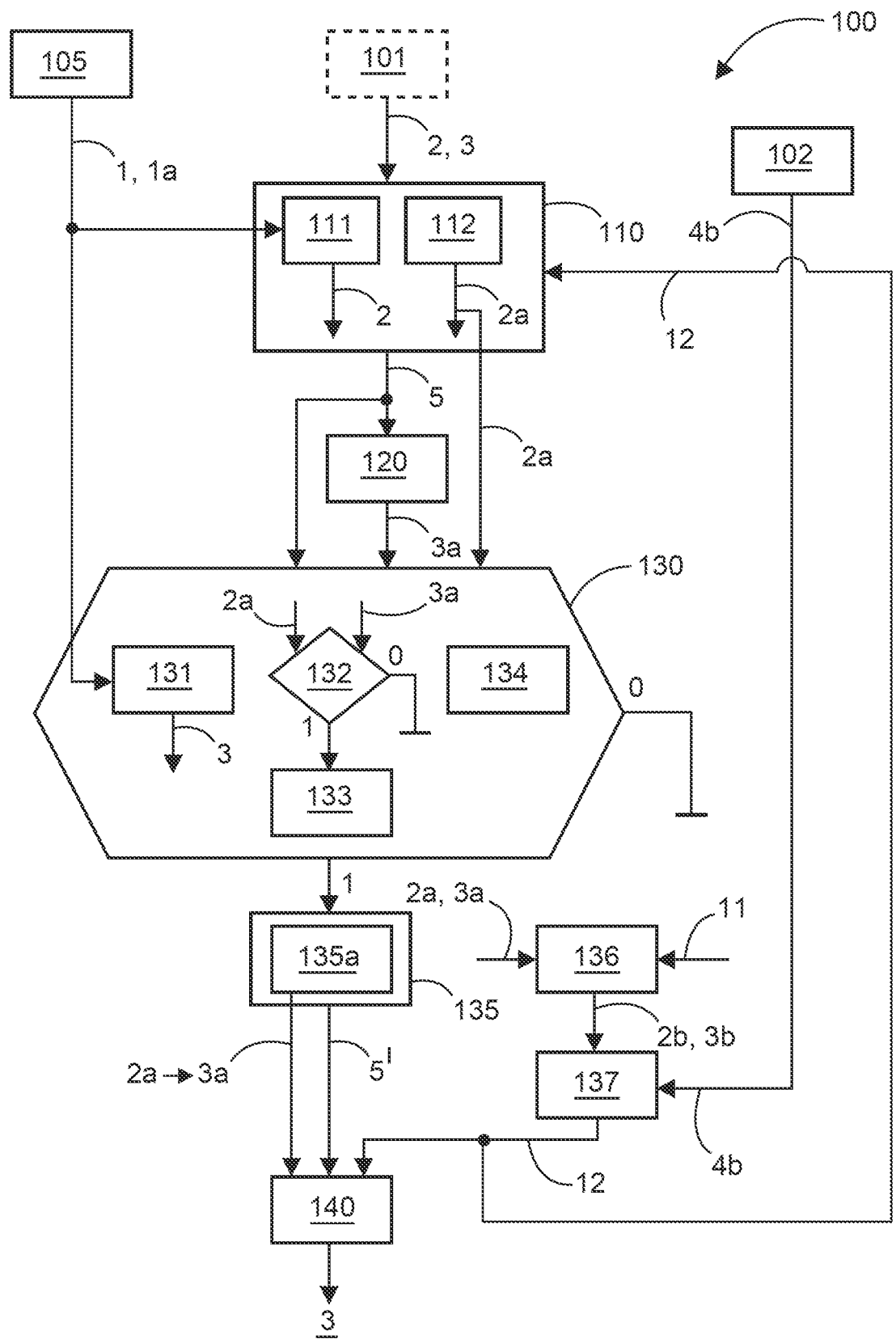

(52) U.S. Cl.
CPC .............. *G05B 2219/25167* (2013.01); *G05B 2219/25428* (2013.01)

(58) Field of Classification Search
CPC ........... G05B 2219/23406; G05B 2219/25167; G05B 2219/25428; G05B 2219/33331; G05B 19/00; G05B 15/00; G05B 13/00; G05B 9/00; G05B 2219/00; G05B 23/00
See application file for complete search history.

(56) References Cited

U.S. PATENT DOCUMENTS

| | | | |
|---|---|---|---|
| 10,551,814 B2 | 2/2020 | Sherriff et al. | |
| 2004/0199351 A1* | 10/2004 | Ott | G05B 23/0256 714/E11.169 |
| 2007/0285224 A1* | 12/2007 | Karschnia | G05B 19/4185 340/539.1 |
| 2011/0054643 A1* | 3/2011 | Law | G06F 11/3636 700/83 |
| 2014/0036712 A1* | 2/2014 | Dewey | H04W 16/18 370/252 |
| 2015/0112469 A1 | 4/2015 | Da Silva Neto et al. | |
| 2015/0287318 A1* | 10/2015 | Nair | G06Q 10/10 340/5.6 |
| 2018/0025304 A1 | 1/2018 | Fisher et al. | |
| 2020/0012249 A1 | 1/2020 | Altendorf et al. | |

FOREIGN PATENT DOCUMENTS

| | | |
|---|---|---|
| DE | 10 2017 104 912 A1 | 9/2018 |
| DE | 10 2018 117 573 A1 | 1/2019 |
| EP | 3 582 032 A1 | 12/2019 |
| EP | 3 598 082 A1 | 1/2020 |
| WO | WO 2020/016361 A1 | 1/2020 |
| WO | WO 2021/028023 A1 | 2/2021 |

* cited by examiner

CONFIGURATION OF FIELD DEVICES WITH A MOBILE DEVICE

CROSS-REFERENCE TO RELATED APPLICATIONS

This application claims the benefit of the filing date of German Patent Application No. 10 2019 218 811.7 filed on 3 Dec. 2019, the entire content of which is incorporated herein by reference.

FIELD

The disclosure relates to the configuration of field devices used for monitoring, visualisation and control of production processes in industrial plants.

TECHNICAL BACKGROUND

For monitoring, visualisation and control of industrial production processes, field devices are often used which record physical measured variables of the process or intervene in the process to control it.

Field devices are often designed to be universally applicable in a variety of situations and may be configured with a large number of setting parameters for their specific application. For this purpose a PC or laptop is connected to a suitable interface of the field device. Increasingly, settings are also made on the field device via wireless interfaces using operating devices such as smartphones and tablets. Most field devices also have a function with which the complete configuration data can be downloaded as a backup file and restored later.

Frequently, use is also made of the possibility of changing settings using local controls on the field device itself. The backup file must then be updated regularly so that a restore will reset the field device to its last working state.

A typical industrial plant contains a large number of different field devices. These field devices are typically connected to narrow-band interfaces at their place of use in an industrial plant, such as current interfaces on which analogue information is coded in the form of currents between 4 and 20 mA. A direct connection of the field devices to a LAN of the industrial plant is usually not planned or not feasible as industrial requirements with regard to two-wire field devices, explosion protection (especially by intrinsic safety), security, memory size, speed etc. are not yet sufficiently defined/standardised for field devices in industrial plants.

For applications where the field devices can be connected to a central server, DE 10 2017 104 912 A1 provides a configuration procedure.

SUMMARY

The present disclosure relates to a method for configuring a target field device in an industrial plant by means of at least one mobile device. The mobile device may in particular be, for example, a smartphone, a Smartwatch, a tablet or a portable computer with a wireless communication interface/radio interface. The field devices in the industrial installation may include, for example, sensors for level, limit level, pressure, temperature or flow in a container or in a pipe. However, the field devices can also include, for example, valves, positioners, signal conditioning instruments as well as control devices which act on other field devices.

According to an embodiment, configuration data, which characterise the behaviour of a source field device in the industrial plant and specifically define the application used, are received from the source field device by the mobile device via a radio interface of the mobile device, which is also supported by the source field device. For this purpose, the source field device can, for example, be selected on the mobile device from a list of available field devices which are within radio range of the field device and can be prompted to send or upload the configuration data by a control command transmitted via the radio interface. However, this is not absolutely necessary. If sufficient bandwidth is available for radio transmission, a field device can also, for example, regularly send its current configuration data on its own initiative.

Furthermore, at least one identification feature characterising a target field device and/or its function in the industrial plant is received by a mobile device. For this purpose, a radio interface of the mobile device is used which is also supported by the target field device. In particular, the mobile device may be the same one that previously received the configuration data from the source field device. However, this is not absolutely necessary. For example, a first mobile device may receive configuration data from a source field device in a first area or at a first location of the industrial plant and pass it on to a second mobile device which communicates with the target field device in a second area or at a second location of the industrial plant. The data exchange between the first mobile device and the second mobile device may then take place, for example, via a cloud, or via direct file exchange between the first mobile device and the second mobile device, for example, by means of XML files. The mobile device may also move the configuration data from a source field device in a radio area A over a physical path in a radio area B and pass on the data to the field device there.

The identification feature may, for example, be a fixed serial number assigned to the field device, which cannot be changed by the operator of the industrial plant. However, the identification feature may also be, for example, a measuring point name or measuring point marking or another designation which is only unique within the respective industrial installation and is assigned by the operator of the industrial installation.

In particular, the identifier can be received by the target field device using, for example, a radio interface of the mobile device. This radio interface can be the same as the one used to receive the configuration data. However, this is not absolutely necessary. For example, in an industrial plant, there may be field devices performing the same function in relation to the industrial process, in a first version with a radio interface of a first type (approximately 2.4 GHz WLAN) and in a second version with a radio interface of a second type (approximately 5 GHz WLAN or Bluetooth). Field devices have a long service life of up to decades. It is therefore conceivable that a manufacturer of field devices, if a new type of radio interface is available, will launch an updated field device on the market which will behave in the same way as the previous one with the only difference that it can also be addressed via the new radio interface. In the meantime/for example LTE-NB1 (NB-IoT) or also LoRa WAN can be mentioned here.

For example, field devices may periodically send a beacon signal (for localisation purposes) with the identifier. The mobile device can receive these beacon signals from all field devices within radio range. By an operator of the mobile device or, for example, by comparison with an identification feature of a target field device already stored in the mobile device, the mobile device is informed which target field device is to be configured.

A field device may also send different beacon signals, for example, depending on whether it has already been configured with configuration data or not. If the field device has already been configured, it can be specially configured as a source field device with a corresponding beacon signal. If, on the other hand, the field device has not yet been configured, it can make itself available as the target field device by means of an appropriate beacon signal. In this way, for example, operating errors resulting from swapping the source field device and the destination field device can be avoided. Such an exchange could result in the existing configuration of the source field device being overwritten by an empty or default configuration of the destination field device that has not yet been configured.

In particular, if the mobile device already knows the identification feature of the target field device, it is possible to address the target field device directly via the radio interface using this identification feature. It is not necessary that the target field device then transmits this identification feature to the mobile device again via radio; it is sufficient to confirm that the field device feels addressed when its identification feature is mentioned.

The identification feature of the target field device may have been made known to the mobile device in advance, for example during work planning. For example, a technician with the task of configuring three newly installed target field devices can have the identification features of these target field devices loaded onto his mobile device immediately.

Using the identifier, it is checked whether the configuration data is suitable and/or intended for the configuration of the target field device. In response to the fact that the configuration data is suitable and/or intended for the configuration of the target field device, at least a subset of the configuration data is sent from the mobile device to the target field device via a radio interface of the mobile device. This is done using a radio interface of the mobile device that is also supported by the target field device. Suitable and/or intended generally applies to devices with the same physical measuring principle (e.g. source field device is a radar level sensor and target field device is also a radar level sensor). Not suitable and/or intended would be typical for different physical measuring principles (e.g. source field device is a radar level sensor and target field device is also a temperature transmitter).

It was recognised that in many industrial plants many instances of certain field devices perform very similar functions. For example, if the industrial plant contains a tank farm consisting of a large number of comparable tanks, and each of these tanks is equipped with a level measuring device of the same type, then these field devices can be configured in essentially the same or identical way. A machine copy of the configuration data from one source field device to several target field devices is then not only faster than a manual configuration of each individual field device, but also less prone to errors. If necessary, individual parameters such as the measuring point name or measuring point identification can be adjusted manually and individually at a later date.

It has also been recognised that transferring from a source field device that is already configured to a target field device is less error-prone and much more direct, faster and possibly safer than, for example, retrieving the configuration data for the target field device from a central server. Even if it is planned that the configuration data stored for a field device on the central server is identical to the configuration data actually effective in the field device, the reality sometimes looks different. For example, the possibility of configuring field devices via a central server, usually as an "add-on", appears alongside the possibility of also making settings via operating elements attached to the device itself. This option is used, for example, if faults occur during the operation of the industrial plant and quick action is required to ensure that the production process does not come to a standstill. In such situations, it is possible that the user may forget to enter the changed configuration data on the server.

It may be advantageous to check especially with the mobile device whether the configuration data are suitable and/or intended for the configuration of the field device. This is a functionality that may not be provided by every field device. By shifting this task to the mobile device, the procedure can therefore be carried out with very little or no modification to the field devices themselves. It is therefore not necessary to upgrade the field devices to a "central point". Older field devices in particular can possibly only be retrofitted with new functions to a limited extent or not at all due to limited hardware resources, so that only the already installed functions are available for the procedure on the side of these field devices.

Another advantage of using the mobile device may be that it can serve as a physical "bridge" between source field devices and destination field devices between which there is no direct radio link. Thus the spatial extent of many industrial plants is greater than the range of usual radio interfaces for licence-free radio applications such as Bluetooth or WLAN. For example, dividing an industrial plant into fire compartments with reinforced concrete walls and steel doors may also mean that not all field devices can communicate directly with each other via radio. The mobile device can record configuration data via the radio interface if it comes within radio range of the source field device. The mobile device can also use the radio interface to return the configuration data when it comes within radio range of the target field device.

The procedure may also facilitate the replacement of a field device with an equivalent or better field device, for example in case of a defect. For this purpose, for example, the configuration data of the old field device can be downloaded to the mobile device and then the old field device can be replaced with the new one. The configuration data can then be transferred back from the mobile device to the new field device, so that the new field device then behaves in the same way as the original field device. The same applies if only the electronics of a field device are replaced with new electronics. The source field device and the target field device are identical in this special case.

In a particularly advantageous embodiment, at least one identification feature is received from each of several field devices. The reception of configuration data involves requesting a selection of the field device from which configuration data is to be obtained from the several field devices as source field device from an operator of the mobile device. If, for example, the operator of the mobile device enters an area of the industrial plant, a radio device list of the field devices currently within radio range can be presented to him. The operator may then select the suitable source field device from this radio device list.

Such, or the same, radio device list can also be used to select the target field device. In another advantageous design, at least one identification feature is received from several field devices. The check involves requesting from an operator of the mobile device a selection of those field devices to which the configuration data are to be sent from the several field devices as target field devices.

In another configuration, at least one identification feature characterising the source field device and/or its function in the industrial plant is received by the mobile device. The check whether the configuration data are suitable and/or intended for the configuration of the field device includes a comparison of this identification feature with the identification feature of the target field device. For example, the identifier may include a type designation of the field device, which may optionally be provided with, for example, a version or revision number. The mobile device can then store, for example, which device types, versions or revisions are upward or downward compatible with each other. Thus, for example, configuration data of an older field device that has a certain functionality can also be used by a newer field device with an extended functionality compared to the older field device. On the other hand, configuration data of the newer field device can only be used by the older field device if only those functions are used which are also implemented in the older field device.

Therefore, in response to the fact that a target field device is of the same type as the source field device or a compatible type, the configuration data may be found to be suitable for the configuration of that target field device.

According to an embodiment, a subset of the configuration data is adapted to the needs of the target field device. The configuration of the destination field device need not therefore be a 1:1 copy of the configuration of the source field device. For example, it may not be appropriate for the destination field device to have the same name or network address (in cases of, for example, Profibus networks or HART multidrop networks) as the source field device. A tank farm, for example, can also—consist of tanks of different sizes, and the configuration of level measuring devices can then contain information about the size of the tank on which they are mounted. The adjustment does not necessarily have to be made on the mobile device, but can also be made in a cloud, for example, to which the configuration data has been transferred from the mobile device.

In particular, for example, at least one identification feature of the source field device contained in the configuration data can be replaced by a new identification feature of the destination field device. For example, when transferring to the target field device, you may be asked for a new measurement point name to be assigned to the target field device.

As explained above, the configuration data of field devices can change during operation of the industrial plant, e.g. by direct manual entry with control elements on the field device itself. Therefore, the configuration data transferred to the mobile device may become obsolete. In another particularly advantageous design, the configuration data are therefore no longer considered suitable for the configuration of target field devices after a specified period of time has elapsed from the time they were received by the source field device. They therefore have an "expiry date". This can be combined in particular with the fact that for the specified period of time for which the configuration data transmitted to the mobile device is to be valid for the configuration of further field devices, a change to the configuration data of the source field device is blocked. Such a lock can then also apply to the target field devices to which this configuration data is transferred. If, for example, a technician configures a large number of target field devices in a tank farm from a source field device with a mobile device, the field devices will not accept any further changes by other operators until the technician has finished configuring all field devices in the tank farm.

According to an embodiment, the position of at least one source field device, and/or the position of at least one destination field device, in the industrial installation is determined by comparing at least one identifier of this field device with a plan of the industrial installation stored on the mobile device. This plan may be in the form of a drawing or a three-dimensional model. This can make it easier for a technician to find the source field device or the target field device and avoid confusion. For example, work orders of the type "today please configure the field devices in the left half of the tank farm" are prone to such mix-ups if the hall with the tank farm has several entrances.

Therefore, in another particularly advantageous configuration, the mobile device calculates a route from the current position of the mobile device to a source field device, and/or to a destination field device, based on the plan of the industrial plant. This route can be offered optimised by internal algorithms in the mobile device with regard to at least one given criterion. For example, the route can be optimised so that the technician can use the ideal route (shortest route or devices with highest priority first), resulting in work optimisation.

The position of the mobile device in the industrial plant can be evaluated in particular, for example, by using the signal strengths with which signals from several field devices are received by at least one radio interface of the mobile device. Satellite-based navigation systems cannot always be received well enough to determine the position with the required accuracy within industrial installations located in enclosed buildings.

According to an embodiment, a level meter, level limit meter, density meter, flow meter, pressure meter, valve, positioner, signal conditioning instrument or control unit is selected as source field device, and/or as target field device. Especially of these types of field devices, there are often accumulations of many instances in industrial plants, where a uniform configuration makes sense.

The configuration data may, in particular, include, for example, parameters of at least one function rule, on the basis of which the source field device, or the target field device, processes values of at least one physical measured variable that it has recorded. For example, the parameters may comprise interpolation points of a linearization curve with which physical measurement data recorded by the field device are added to a quantity output by the field device.

In particular, the procedures may be wholly or partly computer-implemented. Therefore, the present disclosure also relates to a computer program containing machine-readable instructions which, when executed on one or more computers, cause the computer or computers to carry out one of the processes described. In this sense, field devices and embedded systems for technical apparatus which are also capable of executing machine-readable instructions are also considered to be computers.

Likewise, the present disclosure also relates to a machine-readable data carrier and/or a download product containing the computer program. A download product is a digital product which can be transmitted via a data network, i.e. downloaded by a user of the data network, and which can be offered for immediate download in an online shop, for example.

Furthermore, a computer may be equipped with the computer program, the machine-readable data carrier or the download product.

SHORT DESCRIPTION OF THE FIGURES

Figure 2:
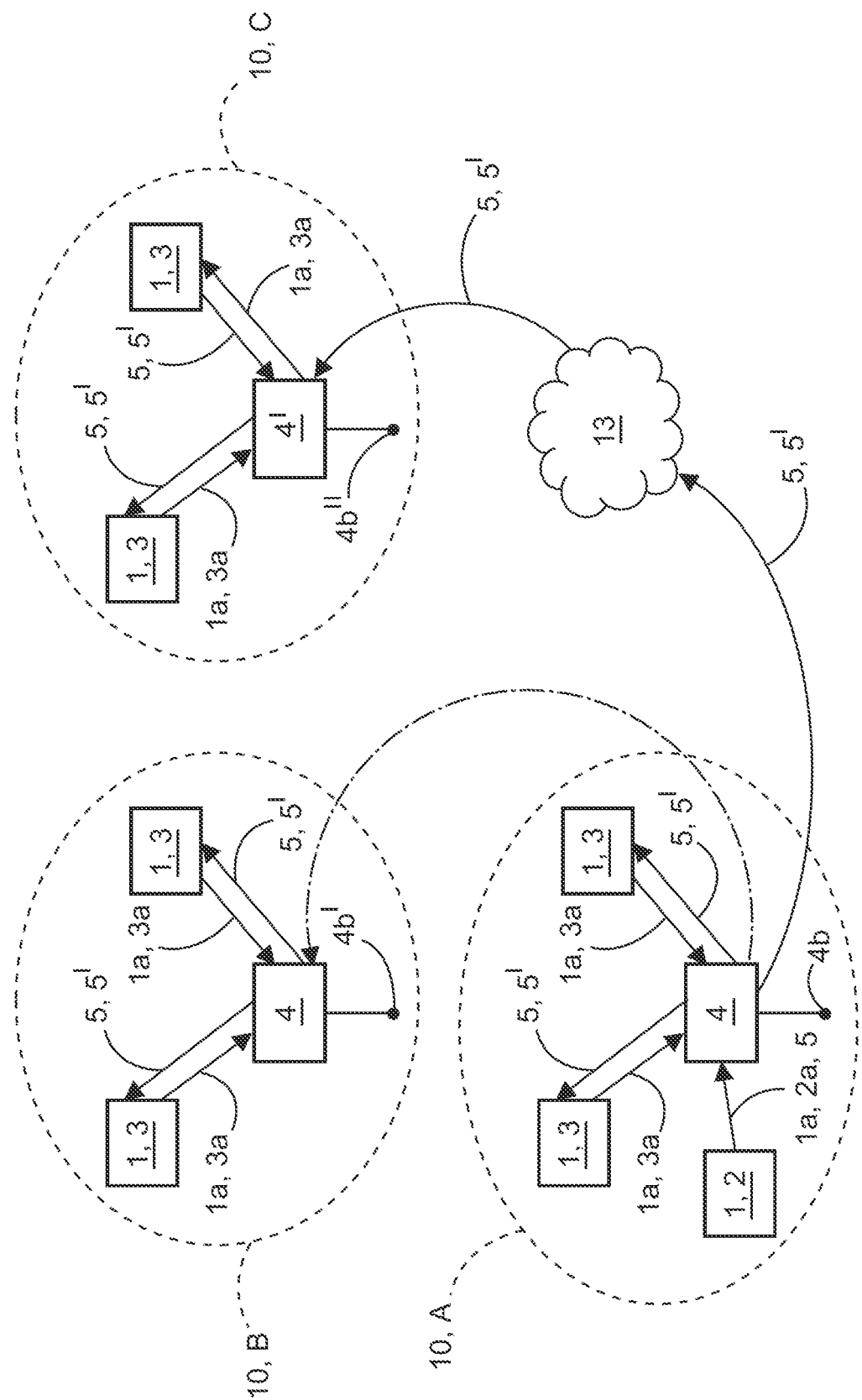

In the following, the subject is further described, without limiting the subject of the present disclosure. It is shown:

FIG. 1: Embodiment of the procedure 100;

FIG. 2: Different scenarios for the application of the procedure 100.

DETAILED DESCRIPTION OF EMBODIMENTS

FIG. 1 is a schematic flowchart of an embodiment of method 100. In step 101, a level meter, level limit meter, density meter, flow meter or pressure meter can be selected as source field device 2, and/or as target field device 3.

In step 110, configuration data 5, which characterises the behaviour of the source field device 2, is received from the source field device 2 by a mobile device 4 via a radio interface.

In step 120, at least one identifier 3a characterising the target field device 3 and/or its function in the industrial plant 10 is received by a mobile device 4, 4'. This mobile device 4, 4' may be identical to the mobile device 4 that previously received the configuration data 5. However, it may also be, for example, another mobile device 4' located in another area or at another site of the industrial installation 10 and receiving configuration data 5 by any means. These two alternatives are further explained in FIG. 2.

In step 130, the mobile device 4, 4' is used to check whether the configuration data 5 are suitable and/or intended for the configuration of the target field device 3, using the identification feature 3a. If this is the case (truth value 1), the configuration data 5 is sent to the target field device 3. In doing so, configuration data 5 can be adapted to the needs of the target field device 3 according to block 135 and is therefore designated with the reference character 5'. In particular, according to block 135a, an identification feature 2a of the source field device 2 contained in configuration data 5 can be exchanged for an identification feature 3a of the destination field device 3 which is to be newly assigned.

According to block 105, identification features 1a can be received from several field devices 1 in industrial plant 10. This makes it possible, in accordance with block 111, to request an operator of mobile device 4 to select one of these field devices 1 as source field device 2. In the same way, a selection of one of the field devices 1 as target field device 3 can be requested by an operator of the mobile device 4, 4' in accordance with block 131.

According to block 112, the mobile device can receive an identification feature 2a characterising the source field device and/or its function in Industrial Plant 10. This identification feature can then be matched with the identification feature 3a of the target field device 3 according to block 132. If this comparison 132 shows that the destination field device 3 is of the same type as the source field device 2 or of a compatible type (truth value 1), the configuration data 5 can be found to be suitable for the configuration of the destination field device 3 in accordance with block 133.

According to block 134, configuration data 5 can be considered as no longer suitable for the configuration of target field devices 3 after a specified period of time has elapsed from the time it was received by the source field device 2. Configuration data 5 is therefore obsolete after this period of time.

According to block 136, position 2b of source field device 2, and/or position 3b of destination field device 3, can be determined from a comparison of the respective identification feature 2a, 3a with a plan 11 of industrial installation 10.

Then, according to block 137, a route 12 can be calculated from the current position 4b of the mobile device 4, 4' to the source field device 2, and/or to the destination field device 3. This makes it easier to visit the source field device 2 or the destination field device 3 with the mobile device 4, 4' in order to contact it for the purpose of receiving 110 configuration data 5 or sending 140 configuration data 5. The position 4b of the mobile device 4, 4' can be evaluated according to block 102 in particular from signal strengths with which signals from several field devices are received through a radio interface of the mobile device 4, 4'.

FIG. 2 shows an exemplary scenario in an industrial plant 10, which here is divided into three areas A, B, C. Areas A and B are at the same site, area C is at a different location. Procedure 100 is used in the example shown in FIG. 2 to configure a large number of target field devices 3 in all three areas A, B and C, starting from a single source field device 2 in area A.

The source field device 2 transmits its identification feature 2a as well as its configuration data 5 to the mobile device 4. Within area A, the mobile device 4 can then distribute the configuration data 5 directly from its position 4b. The mobile device 4 receives the respective identification feature 3a from each target field device 3 and in return transmits the configuration data 5 or the version 5' adapted to the respective target field device.

When the mobile device 4 reaches the new position 4b' in area B, it can connect to other target field devices 3 there and distribute configuration data 5, 5' in the same way as it did before in area A.

The configuration data 5, 5' can also be used in area C at the remote site. For this purpose, the mobile device 4 can transmit the configuration data 5, 5' to a cloud 13. Another mobile device 4' at location 4b'' in area C can retrieve the configuration data 5, 5' from the Cloud 13 and distribute them in area C in the same way as if it had previously captured them in area A itself.

LIST OF REFERENCE SIGNS

1 Field device
1a Identification feature of the field device 1
2 Source field device as field device 1
2a Identification feature of the source field device 2
2b Position of the source field device 2
3 Target field device as field device 1
3a Identification feature of the target field device 3
3b Position of the target field device 3
4 mobile unit, movable from area A to area B
4' mobile device in area C
4b Position of mobile device 4 in area A
4b' Positions of mobile device 4 in area B
4b'' Position of mobile device 4' in area C
5 Configuration data
5' Configuration data adapted to target field device 3
10 Industrial plant
11 Plan of the industrial plant 10
12 Route within the industrial plant 10
13 Cloud
100 Method
101 Selecting source field device 2 and/or destination field device 3
102 Determining position 4b from received signal strengths
105 Receiving many identification features 1a from field devices 1
110 Receiving configuration data 5
111 Requesting a selection of the source field device 2

112 Receiving the identifier 2a
120 Receiving the identifier 3
130 Check whether configuration data 5 is suitable/intended for target field device 3
131 Requesting a selection of the target field device 3
132 Comparison of identification features 2a and 3a
133 Release of configuration data 5 for compatible devices 2, 3
134 Expiry of configuration data 5 after a defined period of time
135 Adjusting the configuration data 5 for target field device 3
135a Exchange of identification feature 2a for feature 3a
136 Determining items 2b, 3b from comparison with plan 11
137 Calculating a route 12 within the industrial plant 10
140 Send configuration data 5, 5' to target field device 3
A, B areas of industrial plant 10 on the same site
C area of industrial plant 10 on remote site

The invention claimed is:

1. A method for configuring a target field device in an industrial plant by way of a mobile device, comprising:
receiving configuration data characterizing behavior of a source field device in the industrial plant from the source field device through the mobile device by way of a radio interface of the mobile device, which is also supported by the source field device;
receiving at least one identification feature characterizing a target field device and/or function of the target field device in the industrial plant by the mobile device by way of a radio interface of the mobile device, which is also supported by the target field device;
determining, by way of processing circuitry of the mobile device and using the identification feature, whether the configuration data are suitable and/or intended for the configuration of the target field device, where the configuration data are suitable and/or intended for the configuration of the target field device when the source field device and the target field device are field devices with a same physical measuring principle; and
in response to the configuration data being suitable and/or provided for the configuration of the target field device, transmitting at least a subset of the configuration data from the mobile device to the target field device by way of a radio interface of the mobile device which is also supported by the target field device.

2. The method according to claim 1, wherein at least one identification feature is received from a plurality of field devices in each case, and
wherein the receiving of the configuration data includes requesting a selection of that field device from which configuration data is to be obtained from the plurality of field devices as source field device from an operator of the mobile device.

3. The method according to claim 1, wherein at least one identification feature is received from a plurality of field devices in each case, and
wherein the checking includes requesting from an operator of the mobile device a selection of those field devices to which the configuration data are to be sent from the plurality of field devices as target field devices.

4. The method according to claim 1, wherein at least one identification feature characterizing the source field device and/or function of the source field device in the industrial plant is received by the mobile device, and
wherein the checking includes a matching of this identification feature with the identification feature of the target field device.

5. The method according to claim 4, wherein in response to the target field device being of a same type as or compatible with the source field device with respect to matching, the configuration data is found to be suitable for the configuration of the target field device.

6. The method according to claim 1, wherein a subset of the configuration data is adapted to needs of a target field device.

7. The method according to claim 6, wherein at least one identification feature of the source field device contained in the configuration data is replaced by a new identification feature for the target field device.

8. The method according to claim 1, wherein the configuration data is determined as no longer suitable for configuration of target field devices after a predetermined period of time has elapsed from a time at which the configuration was received by the source field device.

9. The method according to claim 1, wherein a position of at least one source field device, and/or a position of at least one target field device, in the industrial plant is determined from a comparison of at least one identification feature of the at least one source or target field device with a plan of the industrial plant stored on the mobile device.

10. The method according to claim 9, wherein a route from a current position of the mobile device to a source field device and/or to a destination field device is calculated by the mobile device on a basis of the plan of the industrial plan, optimized with respect to at least one predetermined criterion.

11. The method according to claim 1, wherein a position of the mobile device in the industrial plant is evaluated using signal strengths with which signals from several field devices are received by at least one radio interface of the mobile device.

12. The method according to claim 1, wherein a level measuring device, limit level measuring device, density measuring device, flow measuring device, pressure measuring device, valve, positioner, evaluation device or control device is selected as the source field device and/or as the target field device.

13. The method according to claim 1, wherein the configuration data include parameters of at least one functional rule, on a basis of which the source field device, or the target field device, processes values of at least one physical measured variable which the source or target field device has recorded.

14. A non-transitory computer readable medium having stored thereon a program containing machine-readable instructions which, when executed on one or more computers, cause the computer or computers to perform a method for configuring a target field device in an industrial plant by way of a mobile device, comprising:
receiving configuration data characterizing behavior of a source field device in the industrial plant from the source field device through the mobile device by way of a radio interface of the mobile device, which is also supported by the source field device;
receiving at least one identification feature characterizing a target field device and/or the function of the target field device in the industrial plant by the mobile device by way of a radio interface of the mobile device, which is also supported by the target field device;
determining, by way of the mobile device and using the identification feature, whether the configuration data are suitable and/or intended for the configuration of the target field device, where the configuration data are suitable and/or intended for the configuration of the target field device when the source field device and the target field device are field devices with a same physical measuring principle; and in response to the configuration data being suitable and/or provided for the configuration of the target field device, transmitting at least a subset of the configuration data from the mobile device to the target field device by way of a radio interface of the mobile device which is also supported by the target field device.

15. A device comprising:

processing circuitry; and memory storing instructions for configuring a target field device in an industrial plant by way of a mobile device that when executed by the processing circuitry causes the processing circuitry to be configured to:

receive configuration data characterizing behavior of a source field device in the industrial plant from the source field device through the mobile device by way of a radio interface of the mobile device, which is also supported by the source field device, receive at least one identification feature characterizing a target field device and/or the function of the target field device in the industrial plant by the mobile device by way of a radio interface of the mobile device, which is also supported by the target field device, determine, by way of the mobile device and using the identification feature, whether the configuration data are suitable and/or intended for the configuration of the target field device, where the configuration data are suitable and/or intended for the configuration of the target field device when the source field device and the target field device are field devices with a same physical measuring principle, and in response to the configuration data being suitable and/or provided for the configuration of the target field device, transmit at least a subset of the configuration data from the mobile device to the target field device by way of a radio interface of the mobile device which is also supported by the target field device.

16. The method according to claim 2, wherein at least one identification feature characterizing the source field device and/or the function of the source field device in the industrial plant is received by the mobile device, and wherein the checking includes a matching of this identification feature with the identification feature of the target field device.

17. The method according to claim 3, wherein at least one identification feature characterizing the source field device and/or the function of the source field device in the industrial plant is received by the mobile device, and wherein the checking includes a matching of this identification feature with the identification feature of the target field device.

18. The method according to claim 2, wherein a subset of the configuration data is adapted to needs of a target field device.

19. The method according to claim 3, wherein a subset of the configuration data is adapted to needs of a target field device.

20. The method according to claim 4, wherein a subset of the configuration data is adapted to needs of a target field device.

* * * * *